G. R. STUNTZ.
Anemometer.
No. 34,321. Patented Feb. 4, 1862.
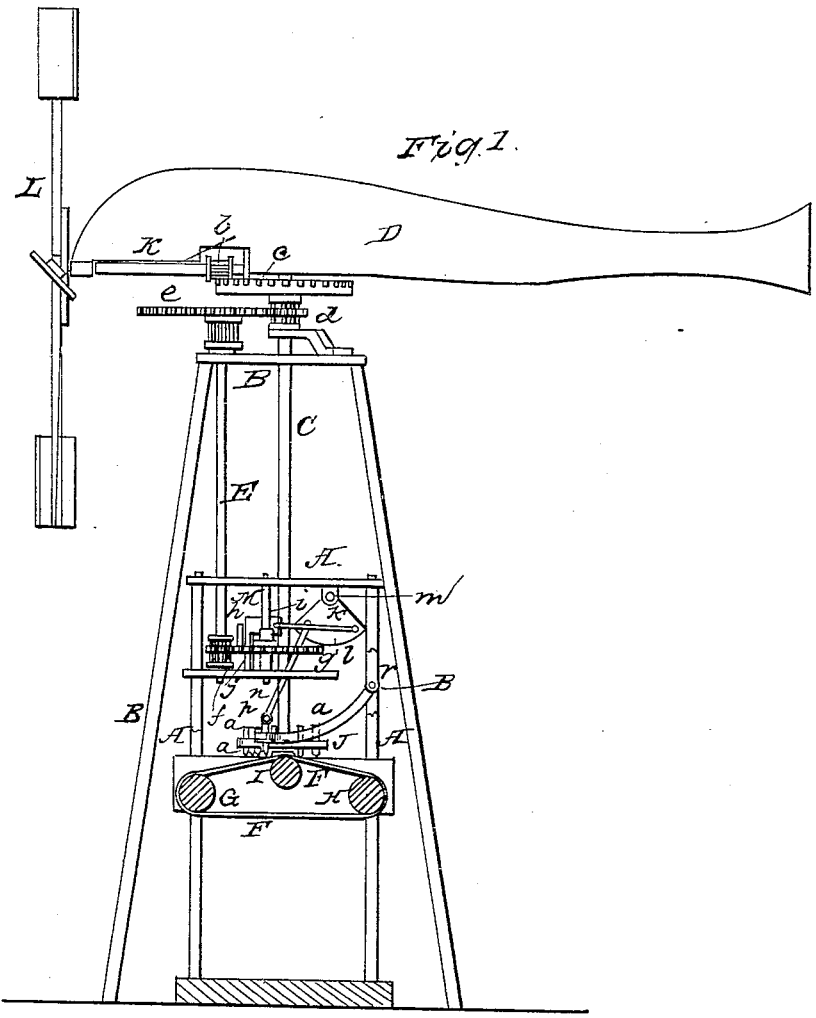
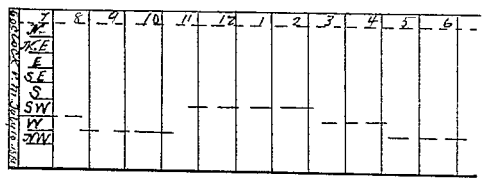
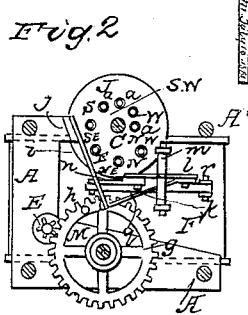

UNITED STATES PATENT OFFICE.

GEORGE R. STUNTZ, OF SUPERIOR, WISCONSIN.

IMPROVEMENT IN ANEMOMETERS.

Specification forming part of Letters Patent No. 34,321, dated February 4, 1862.

*To all whom it may concern:*

Be it known that I, GEORGE R. STUNTZ, of Superior, in the county of Douglas and State of Wisconsin, have invented a new and Improved Anemometer; and I do hereby declare that the following is a full, clear, and exact description of the same, reference being had to the accompanying drawings, forming part of this specification, in which—

Figure 1 is an elevation of the machine, partly in section; Fig. 2, a horizontal section of the same, and Fig. 3 a diagram to illustrate the character of the record made by the machine.

Similar letters of reference indicate corresponding parts in the several figures.

This invention consists in a certain system of pencils or other marking-instruments connected with a vane and applied, in combination with a sheet of paper or other material moved at a regular speed by a clock-movement, for the purpose of indicating and recording the direction and changes of direction of the wind through a considerable period of time.

It also consists in certain improved means operating in combination with the vane and movable sheet of paper or other material for the purpose of indicating and recording the force or velocity of the wind during a period of time.

To enable others to make and use my invention, I will proceed to describe its construction and operation.

A represents a frame for those parts of the machine which require to be within doors or under cover, and B is a frame for supporting the upper bearing of the upright shaft C, to which the vane D is secured, and the upper bearing of a second upright shaft E. The frame B may be continued upward through the roof of a building in the form of a tower or cupola in order to elevate the vane above the general surface of the roof of the building in which the instrument is placed to a sufficient height to indicate the true direction of the wind. The shaft E extends through the top of the tower or cupola and nearly up to the vane.

F is an endless apron carrying the paper or other material on which the record of the direction and force or velocity of the wind is to be made, said apron running around two horizontal rollers G H, arranged in bearings in the frame A. One of said rollers is driven at a uniform velocity by means of a clock-movement, and so moves the apron and the paper upon it a given distance per hour.

The vane-shaft C, which has one or more bearings in the frame A, is situated very near to one side of the apron F at about midway between the rollers G H, and opposite to this shaft there is arranged in suitable bearings a third roller I parallel with G H, and at such an elevation as to raise the upper portion of the apron at the middle of its length in the manner shown in Fig. 1.

On the lower part of the vane-shaft is secured the pencil-holder J, carrying the pencils or equivalent marking-instruments $a\ a$ for recording the direction of the wind. This pencil-holder, which rotates with the vane, consists of a plate having holes or tubes in it for the reception of the pencils, which drop loosely into the said holes, but are prevented either by their own formation or by the formation of the holes or by the use of adjusting screws and nuts from dropping down much lower than is necessary to enable them to mark upon the highest part of the paper on the apron F, so that only the pencil that is situated over the highest part of the apron above the roller I shall be capable of marking. The number of pencils may be eight, sixteen, or thirty-two, or any number in the same scale of progression corresponding with the divisions of the compass. They are arranged in lines radiating from the center of the shaft C and dividing the circle of the plate into a corresponding number of equal parts, and are set at distances from the center of the shaft, which increase regularly all the way round the shaft, as shown in Fig. 2.

The machine represented has eight pencils arranged in lines radiating from the center of the shaft at forty-five degrees apart and indicating the four cardinal points of the compass and the four principal intermediate points. The several pencils are marked in Fig. 2 to show the points of the compass indicated by them, north being the farthest from the center. By this arrangement of the pencils they will be caused to mark lines parallel with the sides of the apron, as shown in Fig. 3, in which the record of the direction of the wind is shown in red color. The pencil-holder is so arranged upon the vane-shaft that when the wind is blowing directly from any of the points of the compass represented by a pencil that pencil will be directly over the center of the roller I, and when the wind is blowing from any of the intermediate points the pencil representing the nearest point will be the nearest to the top of the roller I.

The paper on which the record is to be made is first ruled transversely at equal distances, as indicated by lines marked with numerals in Fig. 3, the said lines being at distances apart equal to the distance moved by the apron every hour, the numerals indicating the hours of the day and night, and the paper being so arranged on the apron that at any given hour the line representing that hour will be opposite to the vane-shaft C and on the highest part of the apron. The paper is also ruled at one end with a number of short lines corresponding with the number of pencils, the distances between such lines being equal to the differences in the distances of the adjacent pencils from the center of the vane-shaft, and these lines are marked with the points of the compass corresponding with those represented by the pencils. The pencil representing that part of the compass from which the wind is blowing, or the point nearest thereto, will mark upon the paper opposite to or at a short distance from the corresponding line, being exactly opposite to that line when the wind is exactly in one of the several points represented by the pencils, and above or below the line when the wind is not exactly in one of those points, and the pencil is consequently not on the top of the roller I. The pencils are made to mark upon the paper by the pressure due to their own weight, either with or without the application of additional weight, and by the marks which they make record the direction and changes of direction of the wind for any length of time, according to the length of the paper on the apron, and this paper may be renewed as often as desirable without stopping or interfering with the action of the machine.

It may sometimes happen that owing to the position of the vane two pencils may be near enough to the top of the roller I to mark upon the paper, and in that case the line marked nearest to a position opposite one of the short lines at the end of the sheet is the correct record.

I will now proceed to describe the means of recording the force or velocity of the wind.

K is a horizontal shaft fitted to work in bearings attached to the vane, and consequently swinging with the vane. This shaft has secured to one end of it which projects beyond the head of the vane a spiral-bladed wind-wheel L, which is caused to derive a rotary motion from the wind, and so impart such a motion to the shaft K and to a pinion $b$, carried by the said shaft. This pinion $b$ gears with and drives a gear $c$, which turns loosely upon the vane-shaft C just below the vane, and this gear carries a second pinion $d$, gearing with and driving a gear $e$, which is fast upon and carries round with it the shaft E, on the lower portion of which there is a pinion $f$, gearing with and driving a gear $g$, which is fast upon an upright shaft M. The gear $g$ rotates very slowly, say once for every one thousand revolutions of the wind-wheel L. The said gear carries a pin $h$, which once in every revolution of the said gear strikes and moves aside one end of a spring $i$, the other end of which is secured to a fixed post $j$, and the said spring is connected by a rod $k$ with a rocker $l$, attached to a horizontal rock-shaft $m$, and this rocker is also connected by a rod $n$ with a pricker $p$, which is attached to and swings with an arm $q$ from a fixed pivot $r$. The pin $h$ in pushing aside the spring $i$ causes the said spring so to act upon the rocker $l$ through the rod $k$ that the said rocker causes the rod $n$ to raise the pricker; but when the pin has passed the spring the spring recoils sufficiently to let the pricker drop and perforate the paper, and on arriving in its normal condition the spring has lifted up the pricker sufficiently to prevent it from obstructing the movement of the paper with the apron. The successive perforations are made in the paper, as shown by dots in Fig. 3, in a line parallel with the sides of the apron, and the number occurring in a given length of the paper denotes the velocity of the wind during the several intervals of time indicated by time-scale on the paper, as the velocity of rotation of the wind-wheel is in proportion to the velocity of the wind. The wheel $g$ may be furnished with two or more pins $h$ $h$ at equal distances apart, and two or more springs $i$ and prickers $p$ may be used to produce a greater or less number of perforations, and by a proper proportion of the gearing and a proper number of pins $h$ $h$ these perforations may be made to indicate miles or any other distances.

What I claim as my invention, and desire to secure by Letters Patent, is—

1. The combination of the system of pencils $a$ $a$ herein described, the vane D, and the endless apron F or equivalent device, moved by clock-work for carrying a sheet of paper or other material on which the record of the direction of the wind is to be made, the whole arranged to operate substantially as herein described.

2. The employment of one or more prickers $p$, actuated by means of one or more springs $i$ and one or more pins $h$, deriving a rotary motion from a train of gearing driven by a wind-wheel attached to the vane, the whole operating substantially as herein described, for the purpose of recording upon the moving sheet of paper or other material the velocity of the wind.

GEORGE R. STUNTZ.

Witnesses:
W. W. PERRY,
W. R. PERRY.